Patented June 19, 1951

2,557,684

UNITED STATES PATENT OFFICE 2,557,684

INHIBITING POLYMERIZATION OF DIOLEFINS

John M. Powers, Baytown, Tex., assignor, by mesne assignments, to Standard Oil Development Company, Elizabeth, N. J., a corporation of Delaware No Drawing. Application August 21, 1948, Serial No. 45,555

15 Claims. (Cl. 202—57)

The present invention is directed to a method of inhibiting the polymerization of diolefins. More specifically, it is directed to a method of activating phenolic inhibiting compounds in the inhibition of the oxygen catalyzed polymerization of diolefins.

It is well known that oxygen, either in molecular form or in compounds such as peroxides, has the property of catalyzing the polymerization of diolefins. This effect has been found to be particularly damaging in commercial operations involving diolefins such, for example, as in the preparation of butadiene or isoprene from petroleum fractions.

As a final step in the preparation of diolefins, such as isoprene, from petroleum, it is customary to subject the product to a fractional distillation step wherein hydrocarbons with boiling points higher than that of the diolefin are eliminated from the material. This distillation step is necessary to allow production of a diolefin of satisfactory polymerization characteristics in the manufacture of synthetic rubber, such as that prepared by copolymerization of a tertiary olefin and a diolefin. The distillation may be carried out or repeated immediately before the diolefin is to be used. Experience has demonstrated that when such an operation is carried out in industrial equipment, a hard crystalline polymer is formed which is quite objectionable in the equipment as will be further explained hereinafter.

Difficulties due to the formation of polymers occur most frequently in fractionating towers, where the formation of high molecular weight resin-like polymers on the heat exchange surfaces, bell caps, bell cap trays, downcomers, etc., is a constant source of trouble. Once started, the formation of this material is quite rapid and has frequently resulted in shutdowns because of plugging. In some cases serious damage to equipment has resulted when the polymer growth was inadvertently allowed to proceed to such an extent that steel tube bundles, bubble cap trays and other elements were distorted because of excessive pressure.

Careful study has indicated that the formation of these polymers is caused by the presence of oxygen in the equipment and may be suppressed by various methods, such as, for instance, by blanketing the feed stream storage tanks with an inert gas. It is evident that an easy method of suppressing the formation of polymer is by the use of a suitable oxidation inhibitor in the diolefin being processed. It is known that among the most efficient inhibitors of this kind are phenolic compounds such as "petroleum phenols," and particularly polyhydroxy phenols and their alkyl derivatives, for instance pyrogallol, hydroquinone, catechol, tertiary butyl catechol, and others. It is believed that such an inhibitor, since it is preferentially oxidized, acts to remove molecular oxygen, thus preventing the oxidation of diolefins to peroxides which catalyze polymer formation; or the inhibitor may, in its oxidized condition, react with a peroxide to destroy the latter and regenerate the hydrocarbon. It has been found, however, that even the addition of reasonable amounts of tertiary butyl catechol, which is one of the most effective oxidation inhibitors, is not always sufficient to prevent excessive polymer formation during the distillation, for example, of butadiene in a commercial installation.

It is known to the art that the oxidation of polyhydroxy phenols, such as pyrogallol, hydroquinone, resorcinol, and catechol, is accelerated in an inorganic alkaline medium. The addition of tertiary butyl catechol together with activating amounts of ammonia, aqueous ammonia, or aqueous caustic to prevent polymer formation in the fractional distillation of diolefins has, therefore, been proposed. It was found, however, that operating difficulties due to emulsion formation occurred in such a fractionation tower when an aqueous solution was added. The addition of ammonia, on the other hand, brings with it the disadvantage of carrying ammonia overhead along with the otherwise purified diolefin, thus producing diolefin contaminated with ammonia, which is undesirable as feed for the polymerization reactions for which it is normally intended. For instance, isoprene contaminated with ammonia is a highly undesirable feed for the commercial production of its copolymer with a tertiary olefin, employing $AlCl_3$ catalyst and methyl chloride solvent, since ammonia reacts with the methyl chloride solvent.

It is an object of my invention to prevent the undesired formation of polymer during the processing or storage of diolefins.

More specifically, it is an object of my invention to provide a method of preventing the undesired polymerization of diolefins by providing a suitable activator to enhance and prolong the protective action of phenolic oxidation inhibitors in contact with the diolefin.

It is another object of the invention to extend the operating life of commercial distillation equipment in which diolefins are separated by fractionation from higher boiling materials by preventing the undesired formation of diolefin polymer therein.

Other objects will be evident as my invention is further described in detail.

I have found that a surprising and entirely unexpected activating effect is obtained by maintaining a relatively small amount of anhydrous aliphatic carboxylic acid in the presence of a phenolic oxidation inhibitor, and that, in the case where polymer formation is to be prevented in fractionation equipment in which a diolefin is removed overhead, an aliphatic carboxylic acid whose boiling point is higher than that of the diolefin is most admirably suited to prevent the polymer formation.

In the practice of my invention, a low concentration of an aliphatic carboxylic acid is maintained simultaneously with a low concentration of a phenolic oxidation inhibitor having no more than ten carbon atoms in an alkyl side chain, such, for example, as "petroleum phenols," pyrogallol, hydroquinone, catechol, tertiary butyl catechol, or thymol, in a mixture comprising polymerizable diolefin while the mixture is undergoing distillation or other physical processing or storage at conditions conducive to the oxygen catalyzed polymerization of the diolefin. It is an additional feature of this invention that, in the case where polymer formation is to be prevented in fractionation equipment in which a diolefin is removed overhead, the aliphatic carboxylic acid may have a higher boiling point than that of said diolefin.

In the specific application of this invention to the fractionation of diolefins, it is known that the highest temperatures occur in the lower section of the fractionating tower, and that conditions are, therefore, most favorable to the undesired polymerization in this part of the equipment. The choice of an activator whose boiling point is higher than that of the diolefin being distilled overhead will, therefore, serve the dual purpose of keeping the overhead stream free of extraneous material and of providing the maximum protection in the lower part of the fractionator, where it is most needed, by maintaining in it an effective concentration of both the phenolic inhibitor and the activator.

Some cases are known, in the commercial distillation of butadiene, in which the greatest polymer formation was found in the upper sections, including the overhead vapor path, of a fractionating tower. In such a case the solution of inhibitor and activator will have to be injected into the vapor space to obtain complete protection, and a small amount of the inhibitor and activator will find their way into the final product. The advantage of the present invention still holds true in this case, since an aliphatic carboxylic acid does not have the same harmful effect as the ammonia previously mentioned.

In order to test the effectiveness of an aliphatic carboxylic acid in activating a phenolic inhibitor, the following runs were carried out. Liquids consisting of (1) isoprene, (2) isoprene containing 500 parts per million of para tertiary butyl catechol, and (3) isoprene containing 500 parts per million of para tertiary butyl catechol and 100 parts per million of glacial acetic acid, respectively, were distilled at total reflux while passing oxygen through the liquid. The oxygen content and the peroxide number of each of these stocks were determined before the run was started, and after one and three days' operation, respectively. The results of the tests are shown as follows:

| Run length | 0 | | 1 day | | 3 days | |
|---|---|---|---|---|---|---|
| | P.P.M. $O_2$ | Peroxide Number | P.P.M. $O_2$ | Peroxide Number | P.P.M. $O_2$ | Peroxide Number |
| Isoprene, Uninhibited | 112 | 9.5 | 496 | 42.2 | 1,200 | 102 |
| Isoprene+500 P.P.M. of T-butyl catechol | 28 | 2.4 | 30 | 2.5 | 266 | 22.6 |
| Isoprene+500 P.P.M. of T-butyl catechol+100 P.P.M. of acetic acid | 18 | 1.5 | 21 | 1.8 | 29 | 2.5 |

The results show that, after three days of contact with oxygen, the peroxide content, as indicated by the peroxide number, was held to about 22% of that of the uninhibited isoprene by the addition of tertiary butyl catechol alone and was held to the much lower value of about 2.5% of that of the uninhibited isoprene by activating the tertiary butyl catechol with acetic acid. It is seen that in prolonged operations the oxygen catalyzed polymer formation is much more effectively prevented by employing the acid as activator for the inhibitor, than when employing the inhibitor alone.

Other conjugated diolefins such as 1,3-butadiene, other pentadienes besides isoprene, such as 1,3-pentadiene or cyclopentadiene, and straight, branched, or cyclic hexadienes, heptadienes, octadienes and their higher polymerizable homologues may be inhibited according to my invention. Other known phenolic oxidation inhibitors which may be employed in the practice of my invention include: "petroleum phenols," which are the phenolic compounds removable from virgin or cracked gasoline and gas oil fractions and normally comprise mixtures of mononuclear poly-substituted aromatic compounds having one to three hydroxyl groups and one to four alkyl side chains of one to about ten carbon atoms; alkyl substituted monohydroxy benzenes such as 4-hydroxy-1,3-dimethyl-benzene, 2-hydroxy-1,3-dimethyl-benzene, and thymol; dihydroxy-benzenes and their alkyl derivatives such as hydroquinone, catechol, tertiary amyl catechol, 4-hexyl-resorcinol, and 4-butyl-resorcinol; trihydroxy benzenes such as pyrogallol and phloroglucinol; and condensed ring phenolic compounds, such as alpha naphthol and 1,5-dihydroxy-naphthalene. And other aliphatic carboxylic acids, particularly those having from one to ten carbon atoms, such as formic, propionic, butyric, isobutyric, valeric, isovaleric, caproic, or capric acid and the like may be used as activator.

In order to illustrate a preferred mode of practicing my invention, the following specific example is given. In the production of substantially pure isoprene from petroleum fractions, for use in copolymerization with a tertiary olefin in a reaction employing $AlCl_3$ catalyst and methyl chloride solvent, the isoprene is subjected to a final purification by fractionation in a fractionating tower which operates at a top pressure between 10 and 12 pounds per square inch gauge, and with temperatures at the top of the tower of about 125° F. and at the bottom of the tower of about 130° F. The fractionating column contains 20 plates which allow said fractionation of an isoprene stream at a reflux ratio (overhead to product) of 8:1, although other reflux ratios may be employed. A vaporized feed stream of 500 pounds per hour of isoprene and heavier components enters the tower at a point near the midsection. 475 pounds per hour of isoprene of 95% or better purity are removed as product from the reflux condenser and about 4000 pounds per hour of condensed overhead product are returned to the top of the tower as reflux. About 25 pounds per hour of isoprene, isoprene dimer, inhibitor, and the like are removed as bottoms. In order to prevent undesired polymer formation in this distillation, an activated inhibitor solution comprising 500 parts of liquid removed from the reflux accumulator, about 5 parts of tertiary butyl catechol, and about one part of glacial acetic acid is continuously injected into the reflux stream returning to the tower, at the rate of 2.5 pounds of inhibitor solution per hour, which is equivalent to about 50 P. P. M. of active inihibitor based on the feed to the distillation. A concentration of this order is maintained in the distillation equipment, and exhausted or excess inhibitor is withdrawn with the bottoms. The relatively high boiling inhibitor will naturally become most concentrated in the lower section of the tower and the reboiler, and thus give maximum protection in the regions where high temperatures promote the polymerization.

Other methods of inhibitor injection may be employed, such as injection at a multiple number of points in the tower, or injection into the feed stream to the tower. Concentrations in the range of 10 to 10,000 P. P. M. of phenolic inhibitor, based on the total diolefin being processed may be used in the practice of my invention. The amount of activating acid may be in the range from 5% to 50% by weight, based on the amount of said inhibitor.

In the preferred method of addition, the inhibitor and activator are mixed before injection into the diolefin solution, although they may be injected separately. The activated inhibitor may be injected undiluted, but it is preferably employed in solution or in suspension, either in a medium of some of the material being processed or in a heavier hydrocarbon or other inert, non-aqueous liquid. The concentration of inhibitor in the solution or suspension to be injected is determined by the ease of manipulation; thus, in a case where only a small amount of inhibitor is required, a more dilute solution will be employed. Concentrations of inhibitor in the injected solution will generally be one per cent or higher.

The activated inhibitor may be injected continuously, or intermittently at regular intervals, or intermittently at irregular intervals sufficient to maintain the desired concentration in the region to be protected.

I do not intend to limit my invention to the conditions of the examples given. It is, for instance, within the scope of this invention to activate the action of phenolic inhibitors in preventing oxygen catalyzed polymerization of diolefins which are being submitted to other physical processing, such as pumping, filtering, heating, and the like, particularly at elevated temperatures in the range from about 70° F. to about 300° F., or when being held in storage in contact with air or after having been in contact with air at any period during processing.

The term "oxygen catalyzed polymerization of diolefins" or its equivalent, as employed in the description and claims, refers to the well known phenomenon of polymerization of diolefins caused by the presence of oxygen in the form of peroxides or chemically similar compounds, or in the form of molecular oxygen.

The nature and objects of the present invention having been completely described what I wish to claim as new and useful and to secure by Letters Patent is:

1. A method of inhibiting the polymerization of a diolefin having from 4 to 8 carbon atoms in the molecule under polymerization conditions which comprises maintaining in said diolefin an amount in the range from 0.001% to 1.0% by weight, based on the amount of diolefin, of a phenolic inhibiting compound having no more than 10 carbon atoms in an alykyl side chain, and an amount in the range from 5% to 50% by weight, based on the amount of phenolic inhibitor, of an aliphatic carboxylic acid having from 1 to 10 carbon atoms.

2. A method in accordance with claim 1 wherein the activating acid is formic acid.

3. A method in accordance with claim 1 wherein the activating acid is acetic acid.

4. A method in accordance with claim 1 wherein the activating acid is propionic acid.

5. A method of inhibiting the oxygen catalyzed polymerization of isoprene by maintaining in said isoprene an amount in the range from 0.001% to 1.0% by weight, based on the amount of isoprene, of para-tertiary butyl catechol, and an amount in the range from 5% to 50% by weight, based on the amount of said para-tertiary butyl catechol, of acetic acid.

6. In the physical processing of hydrocarbon fluids comprising at least one diolefin having from 4 to 8 carbon atoms in the molecule wherein the polymerization of said diolefin is inhibited by maintaining in said hydrocarbon fluid an amount in the range from 0.001% to 1.0% by weight, based on the amount of diolefin, of a phenolic peroxidation inhibiting compound having no more than 10 carbon atoms in an alkyl side chain, the improvement comprising maintaining in said hydrocarbon fluid an inhibitor-activating amount in the range from 5% and 50% by weight, based on the amount of inhibitor, of an aliphatic carboxylic acid having from 1 to 10 carbon atoms.

7. A method in accordance with claim 6 wherein the activating acid is formic acid.

8. A method in accordance with claim 6 wherein the activating acid is acetic acid.

9. A method in accordance with claim 6 wherein the activating acid is propionic acid.

10. A method for distilling a fraction comprising at least one diolefin having from 4 to 8 carbon atoms in the molecule which comprises injecting into a fractionating zone a stream of said fraction comprising diolefin, maintaining in at least the hottest section of said fractionation zone a controlled amount in the range from 0.001 to 1.0% by weight, based on the amount of said diolefin, of a phenolic inhibitor having no more than 10 carbon atoms in an alkyl side chain, and an amount in the range from 5% to 50% by weight, based on the amount of said inhibitor, of an aliphatic carboxylic acid having from 1 to 10 carbon atoms and having a boiling point higher than the diolefin being distilled, and recovering overhead a fraction enriched in diolefin.

11. A method in accordance with claim 10 in which the inhibitor is tertiary butyl catechol and the activating acid is acetic acid.

12. A method for distilling a mixture comprising at least one diolefin having from 4 to 8 carbon atoms in the molecule and material boiling higher than said diolefin, which includes the steps of charging said mixture into the middle section of a fractionating tower maintained under distillation conditions, injecting into an upper portion of said tower a stream of peroxidation inhibitor comprising an amount in the range from 0.001% to 1.0% by weight, based on said diolefin, of tertiary butyl catechol, and an amount in the range from 5% to 50% by weight, based on said tertiary butyl catechol, of acetic acid, withdrawing from the bottom of the tower contaminants and inhibitor heavier than said diolefin, and recovering an overhead fraction comprising substantially pure diolefin.

13. A method in accordance with claim 12 in which the diolefin is isoprene.

14. A method for distilling a mixture containing butadiene and components boiling higher than butadiene which includes the steps of charging said mixture into the middle section of a fractionating tower maintained under distillation conditions, injecting into an upper portion of said tower a stream of peroxidation inhibitor comprising an amount in the range from 0.001% to 1.0% by weight, based on the butadiene, of tertiary butyl catechol and an amount in the range from 5% to 50% by weight, based on said tertiary butyl catechol, of acetic acid, withdrawing from the bottom of the tower contaminants and an inhibitor heavier than butadiene and recovering an overhead fraction consisting substantially of pure butadiene.

15. A method for distilling a mixture comprising at least one diolefin having from 4 to 5 carbon atoms in the molecule and components boiling higher than said diolefin which includes the steps of charging said mixture into the middle section of a fractionating tower maintained under distillation conditions, injecting into an upper portion of said tower a stream of peroxidation inhibitor comprising an amount in the range from 0.001% to 1.0% by weight, based on said diolefin, of tertiary butyl catechol, and an amount in the range from 5% to 50% by weight, based on said tertiary butyl catechol, of acetic acid, withdrawing from the bottom of the tower contaminants and inhibitor heavier than said diolefin, and recovering an overhead fraction comprising substantially pure diolefin.

JOHN M. POWERS.

REFERENCES CITED

The following references are of record in the file of this patent:

UNITED STATES PATENTS

| Number | Name | Date |
|---|---|---|
| 2,210,838 | Lange et al. | Aug. 6, 1940 |
| 2,361,538 | Franz | Oct. 31, 1944 |
| 2,407,861 | Wolk | Sept. 16, 1946 |
| 2,425,842 | Seyfried | Aug. 19, 1947 |